(12) United States Patent
Kawashimo

(10) Patent No.: US 9,380,407 B2
(45) Date of Patent: *Jun. 28, 2016

(54) INFORMATION PROCESSING APPARATUS AND COMMUNICATION CONTROL METHOD

(71) Applicant: Kabushiki Kaisha Toshiba, Tokyo (JP)

(72) Inventor: Satoshi Kawashimo, Oume (JP)

(73) Assignee: KABUSHIKI KAISHA TOSHIBA (JP)

( * ) Notice: Subject to any disclaimer, the term of this patent is extended or adjusted under 35 U.S.C. 154(b) by 70 days.

This patent is subject to a terminal disclaimer.

(21) Appl. No.: 14/297,544

(22) Filed: Jun. 5, 2014

(65) Prior Publication Data

US 2014/0287689 A1 Sep. 25, 2014

Related U.S. Application Data

(63) Continuation of application No. 13/250,905, filed on Sep. 30, 2011, now Pat. No. 8,781,394.

(30) Foreign Application Priority Data

Sep. 30, 2010 (JP) ................................ 2010-223189

(51) Int. Cl.
*H04B 5/02* (2006.01)
*H04B 5/00* (2006.01)
(Continued)

(52) U.S. Cl.
CPC ................. *H04W 4/008* (2013.01); *H04B 5/02* (2013.01); *H04W 12/06* (2013.01); *H04W 84/18* (2013.01)

(58) Field of Classification Search
CPC .................................. H04L 63/18; H04B 5/00
See application file for complete search history.

(56) References Cited

U.S. PATENT DOCUMENTS 7,206,579 B2 4/2007 Gwon et al.
7,656,806 B2 * 2/2010 Hinata .................... G06F 3/061
370/238

(Continued)

FOREIGN PATENT DOCUMENTS

JP 2003-230169 8/2003
JP 2008-160324 7/2008

(Continued)

OTHER PUBLICATIONS

Office Action received in Japanese Patent Application No. 2010-223189; dispatched on Feb. 21, 2012; in 7 pages.

(Continued)

*Primary Examiner* — Cindy Trandai
(74) *Attorney, Agent, or Firm* — Knobbe, Martens, Olson & Bear, LLP

(57) ABSTRACT

According to one embodiment, there is provided information processing apparatus, including: a first communication module configured to perform a communication under a first communication scheme which corresponds to a proximity wireless communication requiring no authentication; a second communication module configured to perform a communication under a second communication scheme which has a communicable distance longer than that of the proximity wireless communication; and a communication controller configured to perform a control, after the first communication module has started a data transmission with another information processing apparatus under the first communication scheme, so as to change-over the first communication scheme to the second communication scheme and then perform the data transmission.

8 Claims, 5 Drawing Sheets

(51) Int. Cl.
*H04W 12/06* (2009.01)
*H04W 4/00* (2009.01)
*H04W 84/18* (2009.01)

(56) References Cited

U.S. PATENT DOCUMENTS

| | | | | |
|---|---|---|---|---|
| 8,126,502 | B2* | 2/2012 | Trainin | H04W 16/14 370/338 |
| 8,301,124 | B2 | 10/2012 | Soma et al. | |
| 2003/0119508 | A1 | 6/2003 | Gwon et al. | |
| 2004/0116074 | A1* | 6/2004 | Fujii | G06K 7/0008 455/41.2 |
| 2005/0093130 | A1* | 5/2005 | Horie | H01L 23/495 257/693 |
| 2005/0254433 | A1* | 11/2005 | Tsukizawa | G06F 1/3203 370/241 |
| 2006/0126492 | A1* | 6/2006 | Hyun | H04L 1/0007 370/208 |
| 2006/0225089 | A1* | 10/2006 | Ikeda | H04W 74/02 725/25 |
| 2007/0239981 | A1 | 10/2007 | Lessing | |
| 2008/0020707 | A1* | 1/2008 | Takayama | H04L 63/045 455/41.2 |
| 2008/0125189 | A1* | 5/2008 | Tomoda | H04B 1/713 455/574 |
| 2008/0171570 | A1* | 7/2008 | Nagao | H04W 88/06 455/552.1 |
| 2009/0111378 | A1* | 4/2009 | Sheynman | H04W 8/005 455/41.1 |
| 2009/0221271 | A1 | 9/2009 | Soma et al. | |
| 2009/0227282 | A1 | 9/2009 | Miyabayashi et al. | |
| 2010/0021176 | A1* | 1/2010 | Holcombe | H04B 10/1143 398/115 |
| 2010/0068996 | A1* | 3/2010 | Haartsen | H04B 5/0025 455/41.1 |
| 2010/0082784 | A1* | 4/2010 | Rosenblatt | H04L 12/2812 709/222 |
| 2010/0100847 | A1 | 4/2010 | Sato et al. | |
| 2010/0216507 | A1 | 8/2010 | Maeda | |
| 2010/0304673 | A1* | 12/2010 | Yoshizawa | H04W 8/005 455/41.2 |
| 2010/0325234 | A1* | 12/2010 | Hiroki | H04W 72/1247 709/207 |
| 2011/0032882 | A1* | 2/2011 | Zechlin | G06F 1/3203 370/329 |
| 2011/0044308 | A1* | 2/2011 | Kawamura | H04W 76/043 370/338 |
| 2012/0077433 | A1* | 3/2012 | Walker | H04M 1/7253 455/41.1 |
| 2012/0083222 | A1 | 4/2012 | Kawashimo | |
| 2013/0094047 | A1* | 4/2013 | Bailey | H04L 63/18 358/1.14 |

FOREIGN PATENT DOCUMENTS

| | | |
|---|---|---|
| JP | 2009-135865 | 6/2009 |
| JP | 2009-147901 | 7/2009 |
| JP | 2009-207069 | 9/2009 |
| JP | 2009-218845 | 9/2009 |
| JP | 2010-178002 | 8/2010 |
| JP | 2010-199752 | 9/2010 |

OTHER PUBLICATIONS

Office Action received in Japanese Patent Application No. 2010-223189; dispatched on May 15, 2012; in 10 pages.

* cited by examiner

*FIG. 3A*

| HEADER | DATA1/n |
|--------|---------|
| HEADER | DATA2/n |
| ⋮ | ⋮ |
| HEADER | DATAn/n |

*FIG. 3B*

| HEADER | DATA1/n | |
|--------|---------|---|
| HEADER | DATA2/n | |
| ⋮ | ⋮ | |
| HEADER | DATAn/n | |

*FIG. 3C*

| HEADER | DATA1/n |
|--------|---------|
| HEADER | DATA2/n |
| ⋮ | ⋮ |
| HEADER | DATAn/n |

INFORMATION PROCESSING APPARATUS AND COMMUNICATION CONTROL METHOD

CROSS-REFERENCE TO RELATED APPLICATION(S)

This application is a continuation of U.S. application Ser. No. 13/250,905, filed Sep. 30, 2011, which is based upon and claims the benefit of priority from Japanese Patent Application No. 2010-223189, filed on Sep. 30, 2010, the entire contents of each of which are incorporated herein by reference.

FIELD

Embodiments described herein relate generally to an information processing apparatus and a communication control method.

BACKGROUND

In recent years, close-range wireless communications, such as "TransferJet" (trademark), are coming into wide use.

However, in case of performing proximity wireless communications, a device on a transmission side and a device on a reception side need to be held in proximity, and hence, in case of performing the communications for a long time, the proximate arrangement of the devices forms an obstacle and sometimes spoils an operability.

BRIEF DESCRIPTION OF DRAWINGS

A general architecture that implements the various feature of the present invention will now be described with reference to the drawings. The drawings and the associated descriptions are provided to illustrate embodiments and not to limit the scope of the present invention.

FIGS. 3A to 3C illustrate data transmission in the embodiment.

DETAILED DESCRIPTION

In general, according to one embodiment, there is provided information processing apparatus, including: a first communication module configured to perform a communication under a first communication scheme which corresponds to a proximity wireless communication requiring no authentication; a second communication module configured to perform a communication under a second communication scheme which has a communicable distance longer than that of the proximity wireless communication; and a communication controller configured to perform a control, after the first communication module has started a data transmission with another information processing apparatus under the first communication scheme, so as to change-over the first communication scheme to the second communication scheme and then perform the data transmission.

Embodiments will be described with reference to the drawings.

Figure 1A:
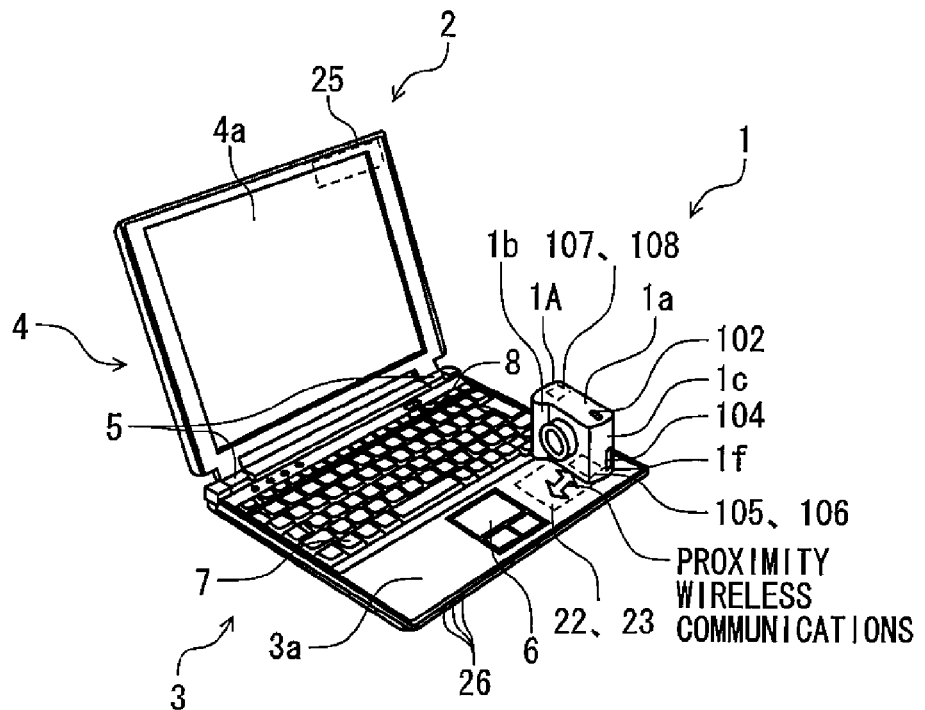
FIGS. 1A and 1B illustrate the communication scheme change-over of an information processing apparatus in an embodiment.
Figure 1B:
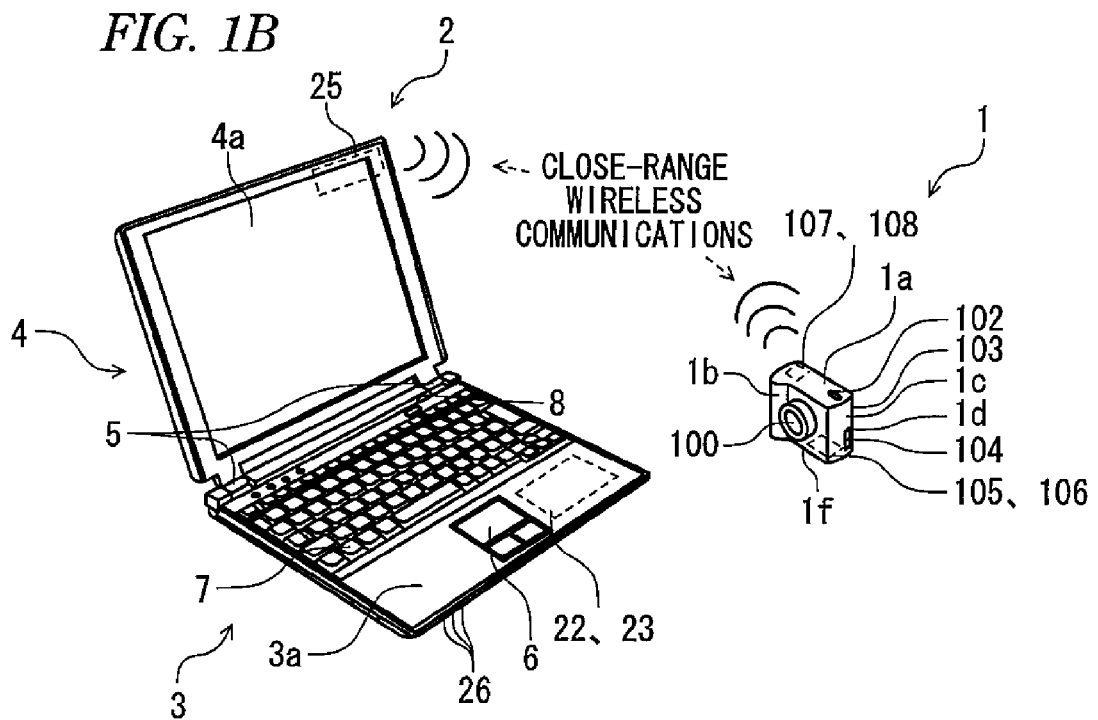

First, the change-over between proximity wireless communications and close-range wireless communications in an embodiment will be described with reference to FIGS. 1A and 1B. FIGS. 1A and 1B illustrate the communication scheme change-over of an information processing apparatus in the embodiment. FIG. 1A is the view showing a mode in which the proximity wireless communications are executed, while FIG. 1B is the view showing a mode in which the close-range wireless communications are executed.

In this embodiment, the change-over of two communication schemes will be explained by exemplifying a camera 1 and a personal computer 2 as the information processing apparatus. Static image or dynamic image data taken by the camera 1 can be transmitted to the personal computer 2 through the proximity wireless communications and the close-range wireless communications. For example, an image taken by the camera 1 is transmitted to the personal computer 2 so as to display the image by a large display device included in the personal computer 2 or to store the data of the image in a storage device included in the personal computer 2. And, image data having been stored in the personal computer 2 are transmitted to the camera 1 so as to store the desired image data in the camera 1 of excellent portability, whereby the image data can be viewed by a display device disposed in the camera 1.

Next, the proximity wireless communications and the close-range wireless communications used in this embodiment will be explained with reference to FIG. 1A.

In this embodiment, an induced electric field is used for the proximity wireless communications as shown in FIG. 1A. For example, "TransferJet" (trademark) may be employed as a proximity wireless communication scheme. The "TransferJet" (trademark) uses a UWB realizes high-speed data transmission. A device compatible with the "TransferJet" (trademark) has an electrode which is called a "coupler", and performs data exchange with an external device by wireless signals employing the induced electric fields. In a case where the external device has approached within a communicable distance (for example, 3 cm), the couplers of both the devices are coupled by the induced electric field, and the wireless communications become executable. The proximity wireless communications here do not require an initial authentication, and the wireless communications can be automatically started when the devices exist within the communicable distance.

Next, the close-range wireless communications in this embodiment will be explained with reference to FIG. 1B. As shown in FIG. 1B, the close-range wireless communications are wireless communications having the communicable distance longer than that of the above-mentioned proximity wireless communications. That is, in the close-range wireless communications, the communicable distance is long, and the devices need not be held in proximity, so that the arrangement relation of the devices is highly versatile. Examples of the communication scheme of the close-range wireless communications are "Bluetooth" (trademark), "WLAN", "3G", "WiMAX", "Wireless USB", etc. In these communication schemes, initial authentications are required for starting the wireless communications.

In the devices compatible with the proximity wireless communications and the close-range wireless communications as stated above, in the case of performing the proximity wireless communications, the devices need to be made proximate to each other, so that the manipulations of the devices might be hindered. Especially in case of transmitting data of large capacity, a fixed time period is expended till the completion of the data transmission, and hence, there is a need to perform another manipulation in the device in parallel in the meantime. In the case, for example, where the proximity wireless communications are performed with the camera 1 placed on the palm rest of the personal computer 2, as shown in FIG. 1A, the manipulations of the keyboard 7, etc. of the personal computer 2 are difficult to be performed, till the end of the data transmission.

In this embodiment, therefore, after the data transmission has been started by the proximity wireless communications, data transmission is performed by changing-over the proximity wireless communications to the close-range wireless communications of the longer communicable distance. The close-range wireless communications are longer in the communicable distance as compared with the proximity wireless communications, and they need not bring the devices into the proximity state to each other. That is, after the change-over to the close-range wireless communications as shown in FIG. 1B, the camera 1 can be displaced from on the palm rest, so that the manipulation of the keyboard 7 is not hindered.

This embodiment performs the data transmission through the change-over from the proximity wireless communications which do not require the initial authentication, to the close-range wireless communications which are longer in the communicable distance than the proximity wireless communications. A user can start the wireless communications merely by only the operation of bringing the devices into proximity to each other, and after the start, the proximity wireless communications are changed-over to the close-range wireless communications in which the wireless communications are not cut off even when the positions of the devices are moved from the proximity state, whereby the conveniences of the devices can be enhanced.

Next, the structures of the camera 1 and the personal computer 2 will be explained with reference to FIGS. 1A and 1B.

The camera 1 includes a body casing 1A, a CCD sensor 101 which is disposed at the side surface 1b of the body casing, a manipulation button 102 which is disposed at the upper surface 1a of the body casing, an LCD 103 which is disposed at the side surface 1d of the body casing, an SD card slot 104 which is provided in the side surface 1c of the body casing, a proximity-wireless-communication module 105 and a proximity-wireless-communication antenna 106 which are disposed in the vicinity of the bottom surface 1f of the body casing, and a close-range-wireless-communication module 107 and a close-range-wireless-communication antenna 108 which are disposed in the vicinity of the upper surface 1a of the body casing.

The personal computer 2 is such that a computer body 3 and a display unit 4 are turnably disposed through hinges 5. The computer body 3 includes a touch pad 6, the keyboard 7, a power source switch 8, a proximity-wireless-communication module 22, a proximity-wireless-communication antenna 23, a close-range wireless communication module 24, a close-range wireless communication antenna 25, and LEDs 26.

The proximity-wireless-communication module 22 and the proximity-wireless-communication antenna 23 are built in at the palm rest part of the casing 3a of the computer body, and the proximity wireless communications are performed in a state where the external device of the opposite party of the communications is placed at this palm rest part. For example, as shown in FIG. 1A, the camera 1 is placed on the computer body casing 3a in which the proximity-wireless-communication antenna 23 is disposed, whereupon the proximity wireless communications are performed between the proximity-wireless-communication antenna 23 and the proximity-wireless-communication antenna 106 which is disposed at the bottom surface 1f of the body casing of the camera 1.

The display unit 4 is centrally provided with a display 4a, and the close-range-wireless-communication antenna 25 is disposed at the upper part of the display unit 4. The close-range-wireless-communication module 24 (not shown in FIGS. 1A and 1B) is disposed on the side of the body unit of the personal computer 2 to be connected with the close-range-wireless-communication antenna 25. This close-range-wireless-communication antenna 25 performs the close-range-wireless-communications with the external device which exists within the communicable distance. That is, in this embodiment, as shown in FIG. 1B, the close-range wireless communications are longer in the communicable distance than the proximity wireless communications. Therefore, the close-range wireless communications can be executed when the camera 1 is arranged near the personal computer 2, without bringing the camera 1 into proximity to the close-range-wireless-communication antenna 25.

Figure 2:
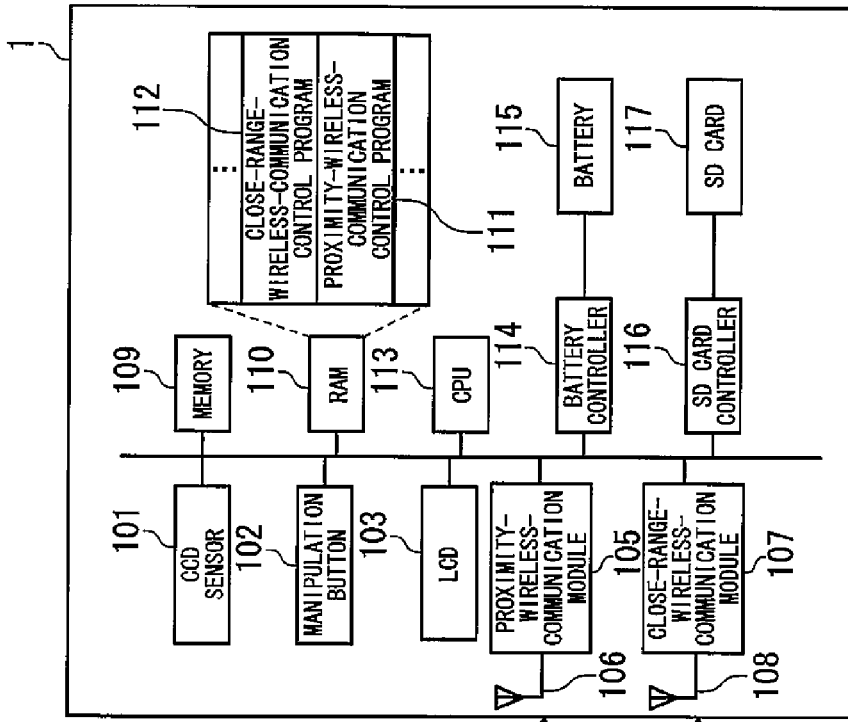
FIG. 2 illustrates a data communication system in the embodiment.
Figure 2:
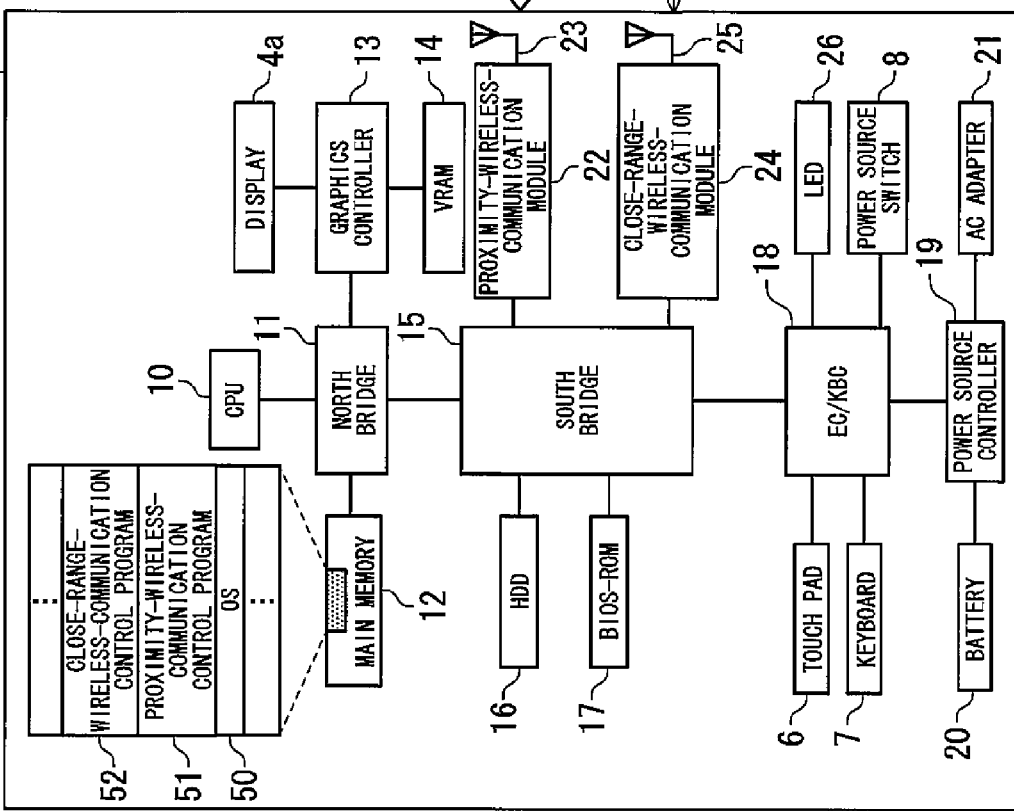

Next, the functions of the camera 1 and the personal computer 2 in this embodiment will be explained with reference to FIG. 2. FIG. 2 illustrates a data communication system in the embodiment.

The camera 1 includes a lens 100, the CCD sensor 101, the manipulation button 102, the LCD 103, the proximity-wireless-communication module 105, the proximity-wireless-communication antenna 106, the close-range-wireless-communication module 107, the close-range-wireless-communication antenna 108, a memory 109, a RAM 110, a CPU 113, a battery controller 114, a battery 115, an SD card controller 116, and an SD card 117.

The CCD sensor 101 takes the image of a scene detected by the lens 100. The manipulation button 102 gives the instructions of a timing at which the image is taken by the CCD sensor 101, and various processes which are executed in displaying the taken image on the LCD 103. This LCD 103 displays the scene detected by the lens 100, the data of the taken image, etc. The SD card slot 104 is a slot which is provided in order to accommodate the SD card being the copying destination of the image data.

The proximity-wireless-communication module 105 performs data exchange with the external device by wireless signals employing induced electric fields. In a case where the external device has come into proximity within the communicable distance (for example, 3 cm), the proximity-wireless-communication antenna 106 and the proximity-wireless-communication antenna of the external device are coupled by the induced electric field, and the wireless communications become executable. The proximity-wireless-communication module 105 converts the wireless signal received by the proximity-wireless-communication antenna 106, into a digital signal, or it converts a digital signal to be used for an internal control, into a wireless signal and then transmits the wireless signal from the proximity-wireless-communication antenna 106

The close-range-wireless-communication module 107 executes the close-range-wireless-communications with the external device through the close-range-wireless-communication antenna 108.

The memory 109 is a storage medium which is included in the camera 1, and which stores taken static images and dynamic image data therein. The RAM 110 is a so-called "working memory" in which various application programs including a proximity-wireless-communication control program 111 and a close-range-wireless-communication control program 112 in this embodiment are expanded. In this embodiment, the change-over of the communication schemes is executed jointly by the proximity-wireless-communication control program 111 and the close-range-wireless-communication control program 112.

The CPU 113 is a control portion for controlling the whole camera 1. The battery controller 114 generates system supply voltages which are to be fed to the individual components of the camera 1, by using the battery 115. The SD card controller 116 accesses the set SD card 117 so as to move or copy stored image data or to output the image data to the LCD 103.

The personal computer 2 includes the display 4a, the touch pad 6, the keyboard 7, the power source switch 8, a CPU 10, a north bridge 11, a main memory 12, a graphics controller 13, a VRAM 14, a south bridge 15, an HDD 16, a BIOS-ROM 17, an EC/KBC 18, a power source controller 19, a battery 20, an AC adapter 21, the proximity-wireless-communication module 22, the proximity-wireless-communication antenna 23, the close-range-wireless-communication module 24, the close-range-wireless-communication antenna 25, and the LEDs 26.

The CPU 10 is a processor to control the operation of this personal computer 2, and it runs an operating system (OS 50) and various application programs which are loaded from the HDD 16 into the main memory 12. The CPU 10 loads a system BIOS stored in the BIOS-ROM 17 into the main memory 12, and then, it runs the system BIOS. The system BIOS is a program for a hardware control. Further, the CPU 10 runs a proximity-wireless-communication control program 51 so as to control the proximity wireless communications which are performed by the proximity-wireless-communication module 22, and a close-range-wireless-communication control program 52 so as to control close-range wireless communications which are performed by the close-range-wireless-communication module 24.

In this embodiment, the change-over of the communication schemes is executed jointly by the proximity-wireless-communication control program 51 and the close-range-wireless-communication control program 52. When instructed to change-over the communication scheme, the proximity-wireless-communication control program 51 acquires authentication information necessary for the close-range wireless communications, from the external device through the proximity wireless communications, and it notifies the authentication information to the close-range-wireless-communication control program 52. The close-range-wireless-communication control program 52 starts the close-range wireless communications with the close-range-wireless-communication module of the opposite communication device based on the received authentication information.

The north bridge 11 is a bridge device which connects the local bus of the CPU 10 and the south bridge 15. A memory controller which access-controls the main memory 12 is also built in the north bridge 11. Further, the north bridge 11 has the function of performing communications with the graphics controller 13 through an AGP (Accelerated Graphics Port) bus or the like.

The main memory 12 is a so-called "working memory" for expanding the operating system (OS 50) and the various application programs stored in the HDD 16, and the system BIOS stored in the BIOS-ROM 17.

The graphics controller 13 is a display controller for controlling the display 4a which is used as the display monitor of the computer 2. This graphics controller 13 generates a video signal which forms a display image to be displayed on the display 4a, from display data which are depicted in the VRAM 14 by the operating system/application program.

The south bridge 15 performs an access to the BIOS-ROM 17 and the controls of disk drives (I/O devices) such as the HDD 16 and an ODD (Optical Disk Drive).

The HDD 16 is a storage device which stores therein the OS 50, the various application programs, etc. For example, it stores therein image data received through the respective wireless communications which are executed by the proximity-wireless-communication module 22 and the close-range-wireless-communication module 24.

The BIOS-ROM 17 is a writable nonvolatile memory which stores therein the system BIOS 51 being the program for the hardware control.

The EC/KBC 18 as an input module controls the touch pad 6 and the keyboard 7. This EC/KBC 18 is a one-chip microcomputer which monitors and controls the various devices (peripheral equipments, sensors, power source circuit, etc.), regardless of the system situation of the personal computer 2. Further, the EC/KBC 18 has the function of turning ON/OFF the power of the personal computer 2 in cooperation with the power source controller 19, in accordance with the user's manipulation of the power source switch 8.

In a case where the power of an external power source is fed through the AC adapter 21, the power source controller 19 generates system supply voltages which are to be fed to the respective components of the personal computer 2, by using the power of the external power source as is fed from the AC adapter 21. On the other hand, in a case where the power of the external power source is not fed through the AC adapter 21, the power source controller 19 generates the system supply voltages which are to be fed to the respective components (body unit 3 and display unit 4) of the personal computer 2, by using the battery 20.

The proximity-wireless-communication module 22 performs the data exchange with the external device by the wireless signals which employ the induced electric fields. In a case where the external device has become proximate within the communicable distance (for example, 3 cm), the proximity-wireless-communication antenna 23 and the proximity-wireless-communication antenna of the external device are coupled by the induced electric field, and the wireless communications become executable. The proximity-wireless-communication module 22 converts the wireless signal received by the proximity-wireless-communication antenna 23, into a digital signal, and it converts a digital signal for use for an internal control, into the wireless signal and then transmits the wireless signal from the proximity-wireless-communication antenna 23.

The close-range-wireless-communication module 24 executes the close-range wireless communications with the external device through the close-range-wireless-communication antenna 25.

The LEDs 26 present the communication scheme of the wireless communications under execution, to the user. For example, the LEDs 26 are lit green during the execution of the proximity wireless communications and red during the execution of the close-range wireless communications. Alternatively, the LEDs 26 may be lit during the execution of the proximity wireless communications while they are flickered during the execution of the close-range wireless communications.

Next, the procedures of data transmissions employing the two wireless communication schemes in this embodiment will be explained with reference to FIGS. 3A to 3C. FIGS. 3A to 3C illustrate the data transmissions in the embodiment. In FIGS. 3A to 3C, a case where image data having been stored in the personal computer 2 are transmitted to the camera 1 is exemplified.

In this embodiment, the change-over of the communication schemes is executed jointly by the proximity-wireless-communication control program 51 and the close-range-wireless-communication control program 52. The change-over of the communication schemes may be automatically performed in accordance with the comparison of a data-transmission time period with a threshold time period which is stored in the proximity-wireless-communication control program 51, or it may be performed by a user selection. The change-over of the communication schemes based on the user selection will be explained later with reference to FIGS. 5A and 5B.

First, as shown in FIG. 3A, the data to be transmitted are divided by a fixed number of bits, and headers indicating the turns of transmissions are affixed to respective packets. In this embodiment, the transmission data are divided by the predetermined number of bits into the n packets. The packets are transmitted with the headers affixed thereto, whereby the device on the reception side can rearrange the data in the turns at the time of the transmissions even in a case where turns for receiving the packets have changed.

The proximity-wireless-communication control program 51 converts the packets divided as shown in FIG. 3A, into wireless signals in succession by the proximity-wireless-communication module 22, and it transmits the wireless signals from the proximity-wireless-communication antenna 23 to the close-range-wireless-communication antenna 106 of the camera 1.

FIG. 3B illustrates data transmission by the proximity wireless communications. More specifically, it shows a state where a command indicating the change-over of the communication scheme has been received in the course of the transmission of the second one of the n packets by the proximity wireless communications. When the command indicating the communication scheme change-over has been received, the proximity-wireless-communication control program 51 transmits the header information of the packet having been under transmission, to the close-range-wireless-communication control program 52. In the example shown in FIGS. 3A to 3C, it is notified to the close-range-wireless-communication control program 52 that the second one of the n packets was being transmitted.

FIG. 3C illustrates data transmission by the close-range wireless communications. More specifically, the close-range-wireless-communication control program 52 starts retransmission from the second one of the n packets, and it transmits the packets to the nth one the n packets. That is, the camera 1 on the reception side receives the second packet by the wireless communications based on both the communication schemes.

When the above-described data transmission is completed, the camera 1 on the reception side rearranges all the packets successively in accordance with the headers, thereby to restore the data.

Figure 4:
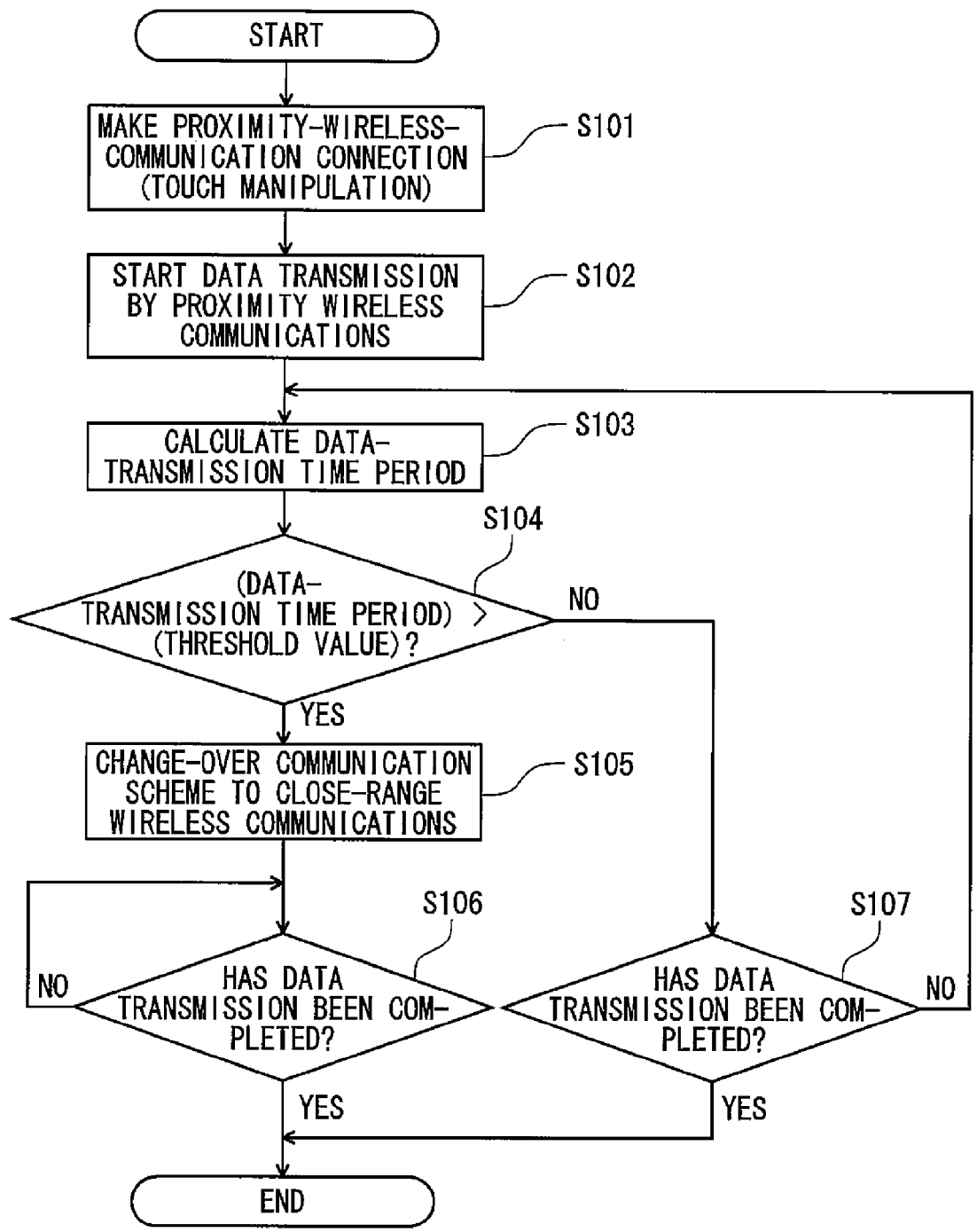
FIG. 4 illustrates the communication scheme change-over process performed in the information processing apparatus in the embodiment.

Next, processing at the time of the change-over of the communication schemes in this embodiment will be explained with reference to FIG. 4. FIG. 4 illustrates a communication-scheme change-over process performed in the information processing apparatus of the embodiment. In FIG. 4, the case where the image data having been stored in the personal computer 2 are transmitted to the camera 1 is exemplified.

First, the proximity-wireless-communication control program 51 makes a proximity-wireless-communication connection (step S101) when the proximity-wireless-communication antenna 23 and the proximity-wireless-communication antenna 106 of the camera 1 are brought into proximity (Touch manipulation).

Next, the proximity-wireless-communication control program starts data transmission by the proximity wireless communications (step S102). In addition, the proximity-wireless-communication control program 51 calculates a data-transmission time period (step S103). That is, the proximity-wireless-communication control program 51 divides the capacity of the data to be transmitted, by a data transmission rate, thereby to calculate the data-transmission time period. The data transmission rate is calculated based on a wireless wave strength in the proximity-wireless-communication antenna 23.

Next, the proximity-wireless-communication control program 51 discriminates whether or not the data-transmission time period calculated at the step S103 is longer than a stored threshold value (step S104). In a case where, as the result of the discrimination at the step S104, the data-transmission time period is longer than the stored threshold value ("Yes" at the step S104), the proximity-wireless-communication control program 51 changes-over the communication scheme to the close-range wireless communications (step S105).

When a command indicating the communication scheme change-over has been received, the proximity-wireless-communication control program 51 acquires authentication information on the close-range wireless communications of the camera 1 (the address, certificate etc. of the module), through the proximity wireless communications, and it notifies the authentication information to the close-range-wireless-communication control program 52. The proximity-wireless-communication control program 51 notifies the header information of a packet having been under transmission, to the close-range-wireless-communication control program 52. The close-range-wireless-communication control program 52 establishes the connection of the close-range wireless communications with the camera 1, based on the received authentication information, and it starts the data transmission from the packet of the header information.

Next, the close-range-wireless-communication control program 52 discriminates whether or not the data transmission has been completed (step S106). That is, it discriminates whether or not the transmission from the packet notified by the proximity-wireless-communication control program 51, to the last packet to be transmitted, has been executed.

In a case where, as the result of the discrimination at the step S106, the data transmission is not completed ("No" at the step S106), the processing returns to the step S106. On the other hand, in a case where, as the result of the discrimination at the step S106, the data transmission is completed ("Yes" at the step S106), the communication-scheme change-over process is ended.

In a case where, as the result of the discrimination at the step S104, the data-transmission time period is not longer than the stored threshold value ("No" at the step S104), the proximity-wireless-communication control program 51 discriminates whether or not the data transmission has been completed (step S107). That is, subject to the discrimination that the data-transmission time period is equal to or shorter than the threshold value, the data transmission based on the proximity wireless communications is continued.

In a case where, as the result of the discrimination at the step S107, the data transmission is not completed ("No" at the step S107), the processing returns to the step S103. That is, there is also supposed a case where the communication environment of the proximity wireless communications has changed (such as a case where the positional relationship of the devices has changed), and hence, the data-transmission time period is calculated again.

On the other hand, in a case where, as the result of the discrimination at the step S107, the data transmission is completed ("Yes" at the step S107), the communication-scheme change-over process is ended.

Figure 5A:
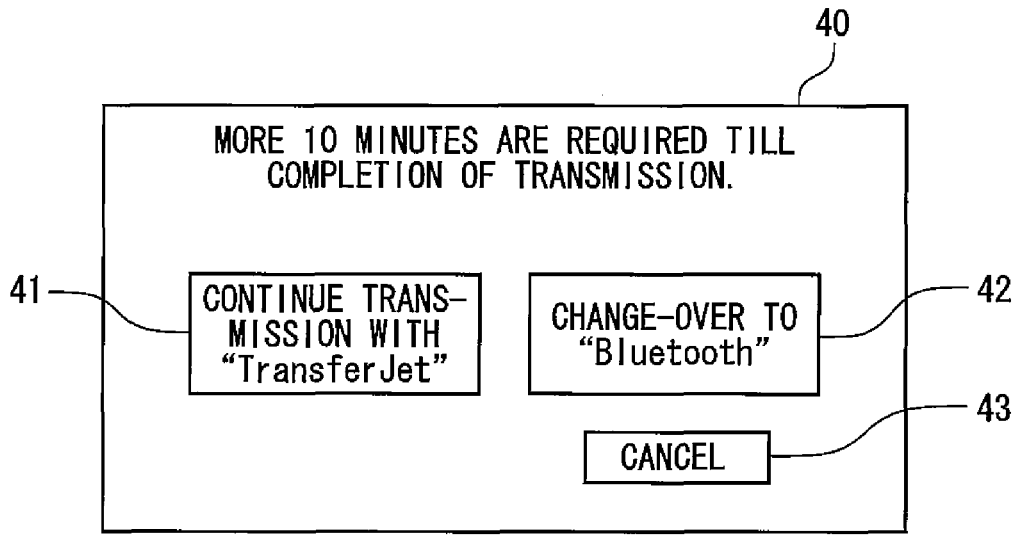
FIGS. 5A and 5B illustrate examples of the user selection screen of the communication scheme change-over of the information processing apparatus in the embodiment.
Figure 5B:
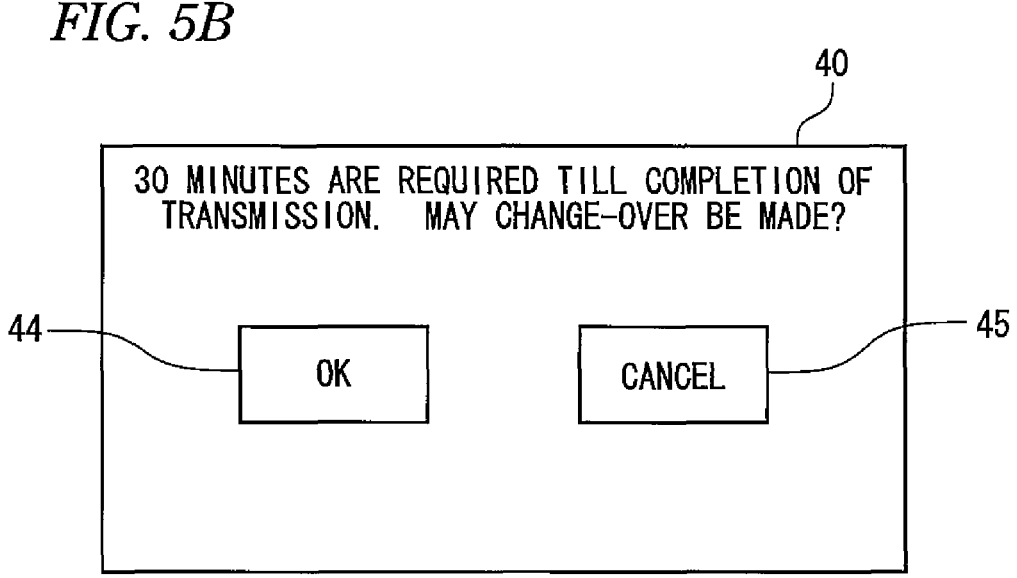

Next, the case where the communication scheme change-over is performed by the user selection will be explained with reference to FIGS. 5A and 5B. FIGS. 5A and 5B illustrate examples of the user selection screen of the communication scheme change-over of an information processing apparatus in the embodiment.

It has been illustrated in FIG. 4 that the communication scheme is automatically changed-over based on whether or not the calculated data-transmission time period is longer than the threshold value (step S104). In this regard, the user selection screen 40 for notifying the calculated data-transmission time period may be displayed on the display 4a so as to change-over the communication scheme through the user selection. In the example of FIG. 5A, "TransferJet" (trademark) and "Bluetooth" (trademark) are respectively exemplified as the proximity wireless communications and the close-range wireless communications.

In the user selection screen 40 shown in FIG. 5A, a proximity-wireless-communication selection button 41 for selecting the continuation of the data transmission based on the "TransferJet" (trademark), a close-range-wireless-communication change-over button 42 for selecting the change-over to the data transmission based on the "Bluetooth" (trademark), and a cancel button 43 for selecting the stop of the data transmission, are displayed together with the calculated data-transmission time period.

When the close-range-wireless-communication change-over button 42 is selected in the user selection screen 40 shown in FIG. 5A, this user selection screen 40 is shifted to the user selection screen 40 shown in FIG. 5B, in order to confirm the change-over of the communication scheme. In the user selection screen 40 shown in FIG. 5B, a close-range-wireless-communication change-over button 44 for selecting the change-over to the "Bluetooth" (trademark), and a cancel button 45 for selecting the stop of the change-over to the "Bluetooth" (trademark), are displayed together with the data-transmission time period based on the close-range wireless communications as has been calculated by the close-range-wireless-communication control program 52.

When the close-range-wireless-communication change-over button 44 is selected, the communication-scheme change-over process is shifted to the step S105 in FIG. 4, and when the cancel button 45 is selected, the process is shifted to the step S107 in FIG. 4. The user is also permitted to select the change-over of the communication scheme, by displaying the user selection screen 40 as stated above.

The case of the change-over from the proximity wireless communications to the close-range wireless communications has been exemplified, but the wireless communications may be permitted to change-over to the proximity wireless communications again after the change-over to the close-range wireless communications. That is, in a case where the manipulation of the personal computer 2 has become unnecessary, a fast data transmission may be performed through the change-over to the proximity wireless communications by placing the camera 1 on the palm rest again.

Although the camera 1 and the personal computer 2 are exemplified as the information processing apparatus, the present invention is not limited thereto, but other devices may be used as long as they include the proximity-wireless-communication module and the close-range-wireless-communication module. For example, the communication scheme change-over in this embodiment may be applied to the data transmission between a television receiver and a video camera, or it may be applied to the data transmission between a main personal computer and a small-sized personal computer for portable use.

According to the above-described embodiment, the enhancement of the manipulability of the information processing apparatus capable of the proximity wireless communications can be attained. In the proximity wireless communications, the communicable distance is short, and hence, the devices need to be held in proximity to each other. However, the proximity wireless communications are permitted to change-over to the close-range wireless communications the communicable distance of which is longer than that of the proximity wireless communications, whereby the data transmission can be continued even when the device is moved.

The present invention is not restricted to the embodiments, but it can be embodied by modifying components within the scope thereof. For example, some components may be omitted from the embodiments, and components of different embodiments may be appropriately combined.

The invention claimed is:

1. An information processing apparatus comprising:
    a first communication module configured to communicate under a first communication scheme comprising:
        a first communicable distance; and
        a first transfer rate,
        the first communication scheme requiring no authentication;
    a second communication module configured to communicate under a second communication scheme comprising;
        a second communicable distance longer than the first communicable distance; and
        a second transfer rate lower than the first transfer rate,
        the second communication scheme requiring an authentication using authentication information; and
    a communication controller configured to:
        upon detecting the information processing apparatus within the first communicable distance to another information processing apparatus, establish a wireless connection with the another information processing apparatus under the first communication scheme,
        determine whether a size of data as a transmission subject exceeds a threshold value,
        when the size of the data is determined to be equal to or smaller than the threshold value, perform the data transmission to the another information processing apparatus under the first communication scheme, and
        when the size of the data is determined to be larger than the threshold value, transfer the authentication information to the another information processing apparatus under the first communication scheme and perform the data transmission to the another information processing apparatus under the second communication scheme.

2. The apparatus of claim 1, wherein the second communication scheme is BLUETOOTH™ or WLAN.

3. The apparatus of claim 1, wherein the communication controller is further configured to, upon establishment of the wireless connection with the another information processing apparatus under the first communication scheme, display a user selection screen to allow a user to select whether or not to perform the data transmission under the second communication scheme.

4. The apparatus of claim 1, wherein the communication controller is further configured to, upon re-placing of the information processing apparatus proximally to the another information processing apparatus during the data transmission under the second communication scheme, change into the data transmission under the first communication scheme.

5. A communication control method of controlling an information processing apparatus comprising a processor and a non-transitory memory, the memory storing an OS and a program, the OS enabling the information processing apparatus to, upon detecting the information processing apparatus within a first communicable distance to another information processing apparatus, establish a wireless connection with the another information processing apparatus under a first communication scheme, the first communication scheme requiring no authentication and comprising the first communicable distance and a first transfer rate, and to perform a data transmission to the another information processing apparatus under the first communication scheme and a data transmission to the another information processing apparatus under a second communication scheme, the second communication scheme requiring an authentication using authentication information and comprising a second communicable distance longer than the first communicable distance and a second transfer rate lower than the first transfer rate, the method comprising:

upon establishment of the wireless connection with the another information processing apparatus under the first communication scheme, determining whether a size of data as a transmission subject exceeds a threshold value, by the program;

when the size of the data is determined to be equal to or smaller than the threshold value, instructing the OS to perform the data transmission to the another information processing apparatus under the first communication scheme, by the program; and when the size of the data is determined to be larger than the threshold value, instructing the OS to transfer the authentication information to the another information processing apparatus under the first communication scheme and to perform the data transmission to the another information processing apparatus under the second communication scheme, by the program.

6. The method of claim 5, wherein the second communication scheme is BLUETOOTH™ or WLAN.

7. The method of claim 6, further comprising, upon establishment of the wireless connection with the another information processing apparatus under the first communication scheme, displaying a user selection screen to allow a user to select whether or not to perform the data transmission under the second communication scheme.

8. The method of claim 7, further comprising, upon re-placing of the information processing apparatus proximally to the another information processing apparatus during the data transmission under the second communication scheme, changing into the data transmission under the first communication scheme.

* * * * *